(12) United States Patent
Cheng et al.

(10) Patent No.: US 6,459,070 B1
(45) Date of Patent: Oct. 1, 2002

(54) PROCESS FOR REPAIRING DEFECT APPLIED IN LIQUID CRYSTAL DISPLAY

(75) Inventors: Jia-Shyong Cheng, Hsinchu Shien; Shou-Jen Chang, Hsinchu; Hsien-Hua Li, Taipei Shien, all of (TW)

(73) Assignee: Hannastar Display Corp., Taipei (TW)

( * ) Notice: Subject to any disclaimer, the term of this patent is extended or adjusted under 35 U.S.C. 154(b) by 20 days.

(21) Appl. No.: 09/782,214

(22) Filed: Feb. 13, 2001

(30) Foreign Application Priority Data

Sep. 6, 2000 (TW) ........................................ 89118264 A

(51) Int. Cl.$^7$ .............................................. B23K 26/20

(52) U.S. Cl. ................................................. 219/121.64

(58) Field of Search ...................... 219/121.6, 121.63, 219/121.64, 121.65, 121.66, 121.85; 228/119

(56) References Cited

U.S. PATENT DOCUMENTS 5,171,963 A * 12/1992 Saruta et al. ........... 219/121.69
6,340,806 B1 * 1/2002 Smart et al. ............ 219/121.69

FOREIGN PATENT DOCUMENTS

GB         2244374 A  * 11/1991  ............ 219/212.69

* cited by examiner

Primary Examiner—Samuel M. Heinrich
(74) Attorney, Agent, or Firm—Peter F. Corless; Christine C. O'Day; Edwards & Angell, LLP

(57) ABSTRACT

A process is provided for repairing a defect applied in producing a liquid crystal display, wherein the liquid crystal display includes a repair circuit structure, and at least one color filter and a liquid crystal formed on a front thereof. The process includes steps of (a) providing a laser having a wavelength of infrared spectrum, and (b) welding the repair circuit from a back of the liquid crystal display by the laser to repair the defect.

11 Claims, 5 Drawing Sheets

PROCESS FOR REPAIRING DEFECT APPLIED IN LIQUID CRYSTAL DISPLAY

FIELD OF THE INVENTION

The present invention relates to a process for repairing defects, and more particularly to a process for repairing defects of a thin film transistor liquid crystal display (TFTLCD).

BACKGROUND OF THE INVENTION

Along with the producing technology development, the liquid crystal display has been become a widely used display device. The working principle of the liquid crystal display is based on the phenomenon that the alignment condition of liquid crystal molecules is changed by applying an electrical field to change the path of light passing through the liquid crystal molecules and the display effect of changing in light and shade is further achieved.

FIG. 1 is a diagram illustrating a unit circuit block of a thin film transistor liquid crystal display according to the prior art. The thin film transistor 11 is controlled by the voltage Vs of scanning line for switching the statuses of "on" and "off". The voltage Vd of the data line is applied to a liquid crystal 12 located between a pixel electrode 131 and a common electrode 132 for changing the alignment condition of the liquid crystal 12 and further controlling the light penetrating degree of the liquid crystal molecules 12. Thus, the emissive intensity from a light source 14 at the back of the liquid crystal display will occur change while the light reaches to the eyes of a user for achieving the display effect of the changing in light and shade. The storage capacitance 15 is used for reinforcing the device characteristics.

The thin film transistor liquid crystal display is formed by producing a lot of arrays constructed by the unit circuit as shown in FIG. 1 on a display panel. However, some defects in the thin film transistor or the connecting line are possible to occur by mistake or through carelessness. The defects will cause a portion of pixel points in the liquid crystal display cannot be operated normally and further seriously affect the image quality of the liquid crystal display. For ruling out the problems caused by the point or line defects, a repair circuit structure is established in the layout of the current thin film transistor liquid crystal display.

FIG. 2A is a top view illustrating a structure of a point defect repair circuit according to the prior art. A repair region 21 is located on a portion of a scanning line 221 overlapped with a portion of a pixel electrode 222 as shown in FIG. 2A. When a thin film transistor 20 is damaged, which results in the pixel point occur the glow point, the laser is applied to the repair region 21 for welding the scanning line 221 and the pixel electrode 222 together to form a common electric potential condition. Thus, the pixel point will not occur apparent glow point for achieving the repairing action.

FIGS. 2B–2C are a top view and a sectional view of a structure of a line defect repair circuit according to the prior art. FIG. 2B illustrates a line defect repair circuit locates between a thin film transistor array 20 and an external control circuit 27. As shown in FIG. 2C, a first metal layer 23 and a second metal layer 24 are electrically connected to a conducting structure 25, respectively. An insulating layer 26 is located between the first metal layer 23 and a second metal layer 24 for insulation. When a defect occurs in a region 251 of the conducting structure 25, a laser is applied to weld a region of the insulating layer 26 which is in contact with the first metal layer 23 and the second metal layer 24 at the same time. Upon the region of the insulating layer 26 is broken by the laser, the first metal layer 23 and the second metal layer 24 are fused to form a region 28 for efficiently achieving the repairing action.

For typical technology, the point or line defect can be detected when the thin film transistor array is finished. The defect can be welded from the front side by a laser having a wavelength of green spectrum for repairing. However, some defects cannot be detected in this stage or occurred in the following stages. At this moment, the upper glass substrate, the color filter and the liquid crystal have already formed on the thin film transistor array, so the color filter and the liquid crystal will be damaged if using a laser having a wavelength of green spectrum is employed for repairing the defect according to the prior art. Hence, generally, the product having the defect is not repaired and would be discarded as the inferior products. Thus, the yield will be decreased because of the defect problem.

Therefore, the purpose of the present invention is to develop a process to deal with the above situations encountered in the prior art.

SUMMARY OF THE INVENTION

It is therefore an object of the present invention to propose a process for repairing a defect applied in producing a liquid crystal display to avoid damaging both a color filter and a liquid crystal formed on the liquid crystal display.

It is therefore another object of the present invention to propose a process for repairing a defect applied in producing a liquid crystal display to reduce the inferior product occurred.

It is therefore an additional object of the present invention to propose a process for repairing a defect applied in producing a liquid crystal display to improve the yield.

According to the present invention, there is proposed a process for repairing a defect applied in producing a liquid crystal display, wherein the liquid crystal display includes a repair circuit structure, and at least one color filter and a liquid crystal formed on a front thereof. The process includes steps of (a) providing a laser having a wavelength of infrared spectrum, and (b) welding the repair circuit from a back of the liquid crystal display by the laser to repair the defect.

Certainly, the repair circuit can be a point defect repair circuit or a line defect repair circuit.

According to the present invention, there is proposed a process for repairing a defect applied in producing a liquid crystal display, wherein the liquid crystal display includes a repair circuit structure, and at least one color filter and a liquid crystal formed on a front thereof. The process includes steps of (a) providing a laser, and (b) welding the repair circuit from a back of the liquid crystal display by the laser to repair the defect.

Preferably, the laser has a wavelength of infrared spectrum.

Certainly, the repair circuit can be a point defect repair circuit or a line defect repair circuit.

According to the present invention, there is proposed a process for repairing a defect applied in producing a liquid crystal display, wherein the liquid crystal display includes a repair circuit structure, and at least one color filter and a liquid crystal formed on a front thereof. The process includes steps of (a) providing a laser having a wavelength of infrared spectrum, and (b) welding the repair circuit by the laser to repair the defect.

Preferably, the laser performed in the welding step is from a back of the liquid crystal display.

Certainly, the repair circuit can be a point defect repair circuit or a line defect repair circuit.

The present invention may best be understood through the following description with reference to the accompanying drawings, in which:

DETAILED DESCRIPTION OF THE PREFERRED EMBODIMENTS

Figure 1:
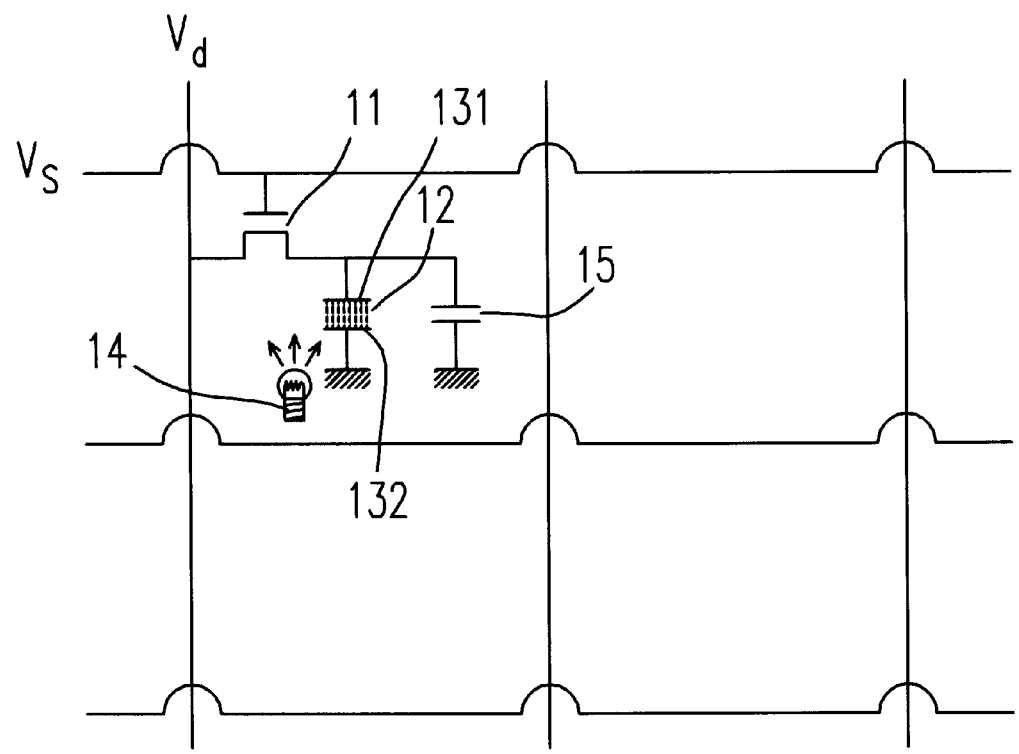
FIG. 1 is a diagram illustrating a unit circuit block of a thin film transistor liquid crystal display (TFTLCD) according to the prior art.
Figure 2A:
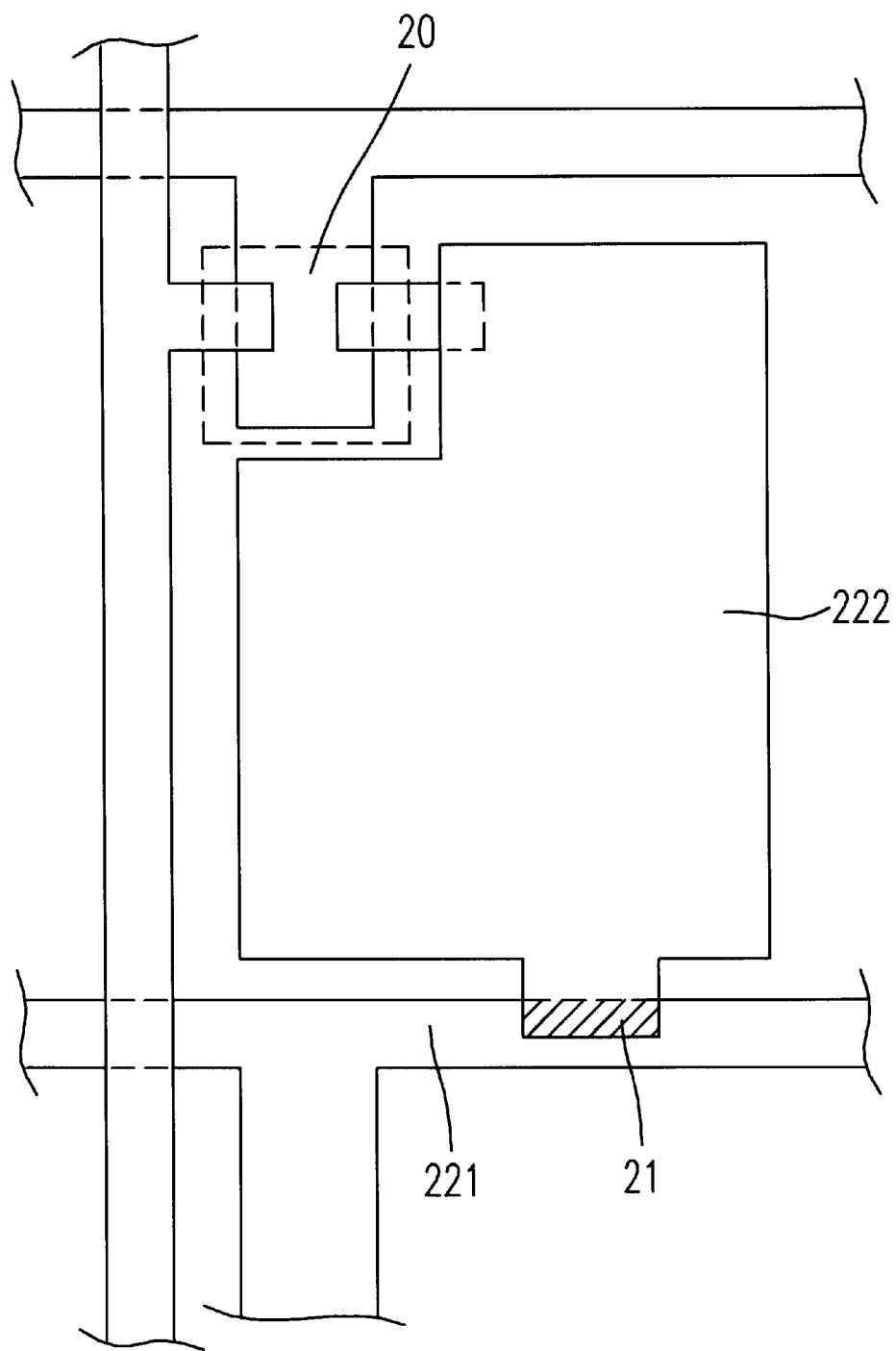
FIG. 2A is a top view illustrating a structure of a point defect repair circuit according to the prior art.
Figure 2B:
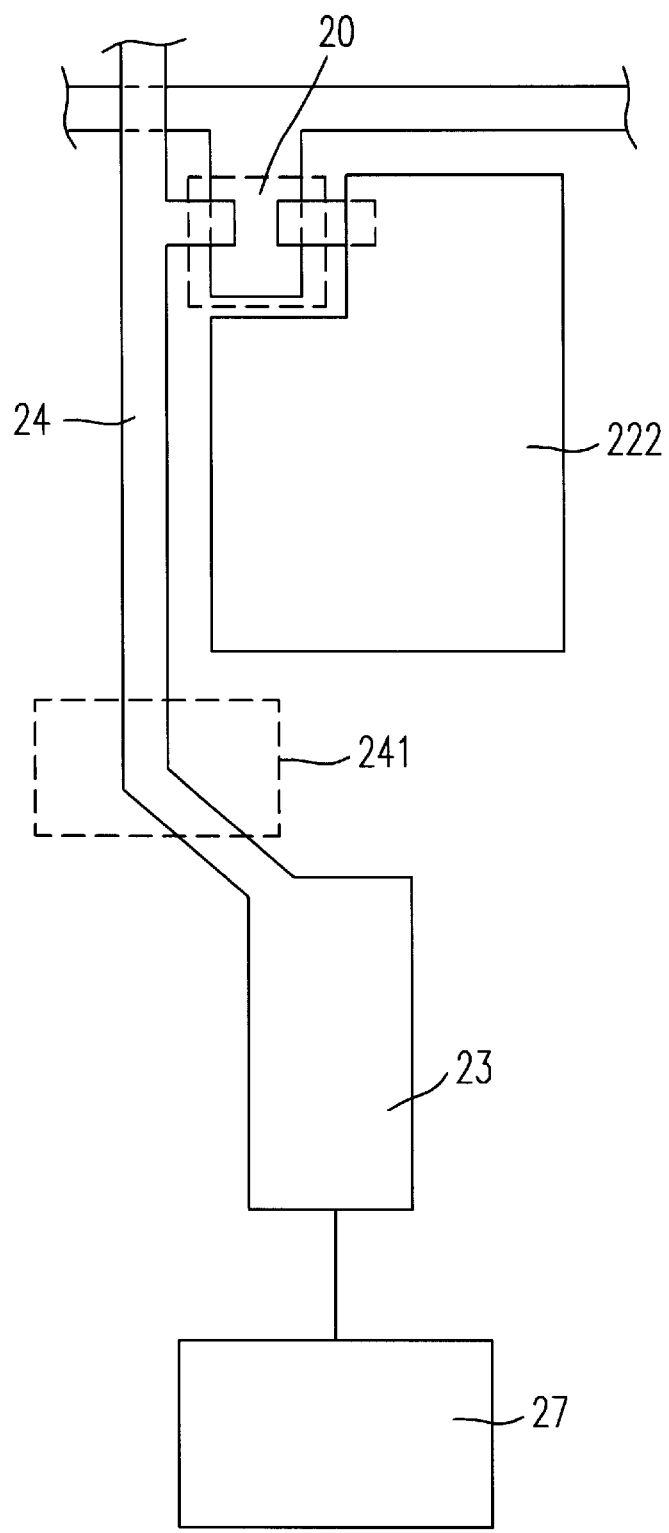
FIG. 2B is a top view illustrating a structure of a line defect repair circuit according to the prior art.
Figure 2C:
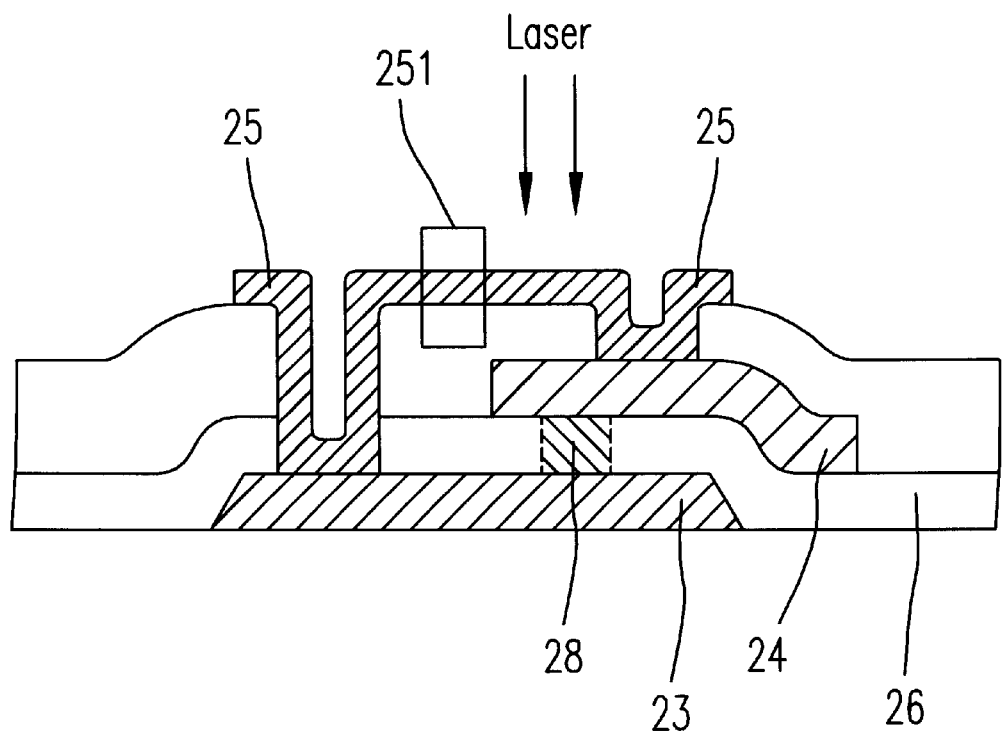
FIG. 2C is a sectional view illustrating a structure of a line defect repair circuit according to the prior art.
Figure 3:
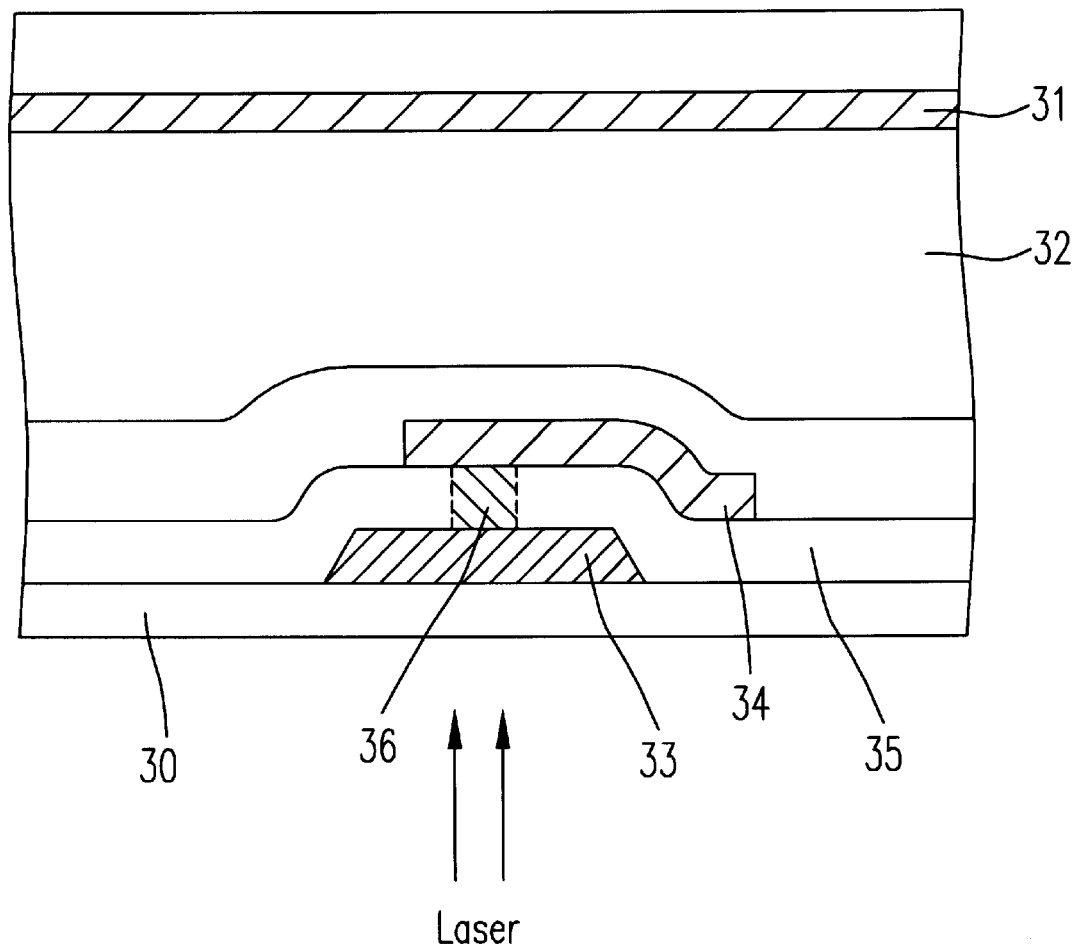
FIG. 3 is a sectional view illustrating a structure of a thin film transistor liquid crystal display having a color filter and a liquid crystal formed thereon according to the present invention.

As shown in FIG. 3A, a color filter 31 and a liquid crystal 32 are formed on a thin film transistor liquid crystal display. The structure of a point or line defect repair circuit is constructed by a first metal layer 33, an insulating layer 35 and a second metal layer 34, which are in order formed on the front of a glass substrate 30 as shown in FIG. 3. When a point or line defect occurred and found after finishing the color filter 31 and the liquid crystal 32 on the thin film transistor liquid crystal display, a laser having a wavelength of infrared spectrum can be provided to illuminate from the back of the glass substrate 30 for repairing the point or line defect. The first metal layer 33 and the second metal layer 34 are welded by the laser, so the insulating layer 35 is broken to fuse the first metal layer 33 with the second metal layer 34 for achieving the electricity. Thus, the defect in the thin film transistor liquid crystal display can be efficiently repaired.

In sum, even though the color filter 31 and the liquid crystal 32 are finished, the method according to the present invention can repair the point or line defect by using the laser having a predetermined wavelength and illuminating directions. Furthermore, according to the present invention, the thin film transistor liquid crystal display can be repaired without damaging the color filter or the liquid crystal. Therefore, the present invention can avoid producing the defect products for efficiently increasing the yield.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A process for repairing a defect applied in producing a liquid crystal display, wherein said liquid crystal display comprises a repair circuit structure, and at least one color filter and a liquid crystal formed on a front thereof, comprising steps of:

(a) providing a laser having a wavelength of infrared spectrum; and (b) welding said repair circuit from a back of said liquid crystal display by said laser to repair said defect.

2. The process according to claim 1, wherein said repair circuit is a point defect repair circuit.

3. The process according to claim 1, wherein said repair circuit is a line defect repair circuit.

4. A process for repairing a defect applied in producing a liquid crystal display, wherein said liquid crystal display comprises a repair circuit structure, and at least one color filter and a liquid crystal formed on a front thereof, comprising steps of:

(a) providing a laser; and (b) welding said repair circuit from a back of said liquid crystal display by said laser to repair said defect.

5. The process according to claim 4, wherein said laser has a wavelength of infrared spectrum.

6. The process according to claim 4, wherein said repair circuit is a point defect repair circuit.

7. The process according to claim 4, wherein said repair circuit is a line defect repair circuit.

8. A process for repairing a defect applied in producing a liquid crystal display, wherein said liquid crystal display comprises a repair circuit structure, and at least one color filter and a liquid crystal formed on a front thereof, comprising steps of:

(a) providing a laser having a wavelength of infrared spectrum; and (b) welding said repair circuit by said laser to repair said defect.

9. The process according to claim 8, wherein said laser performed in said welding step is from a back of said liquid crystal display.

10. The process according to claim 8, wherein said repair circuit is a point defect repair circuit.

11. The process according to claim 8, wherein said repair circuit is a line defect repair circuit.

* * * * *